UNITED STATES PATENT OFFICE.

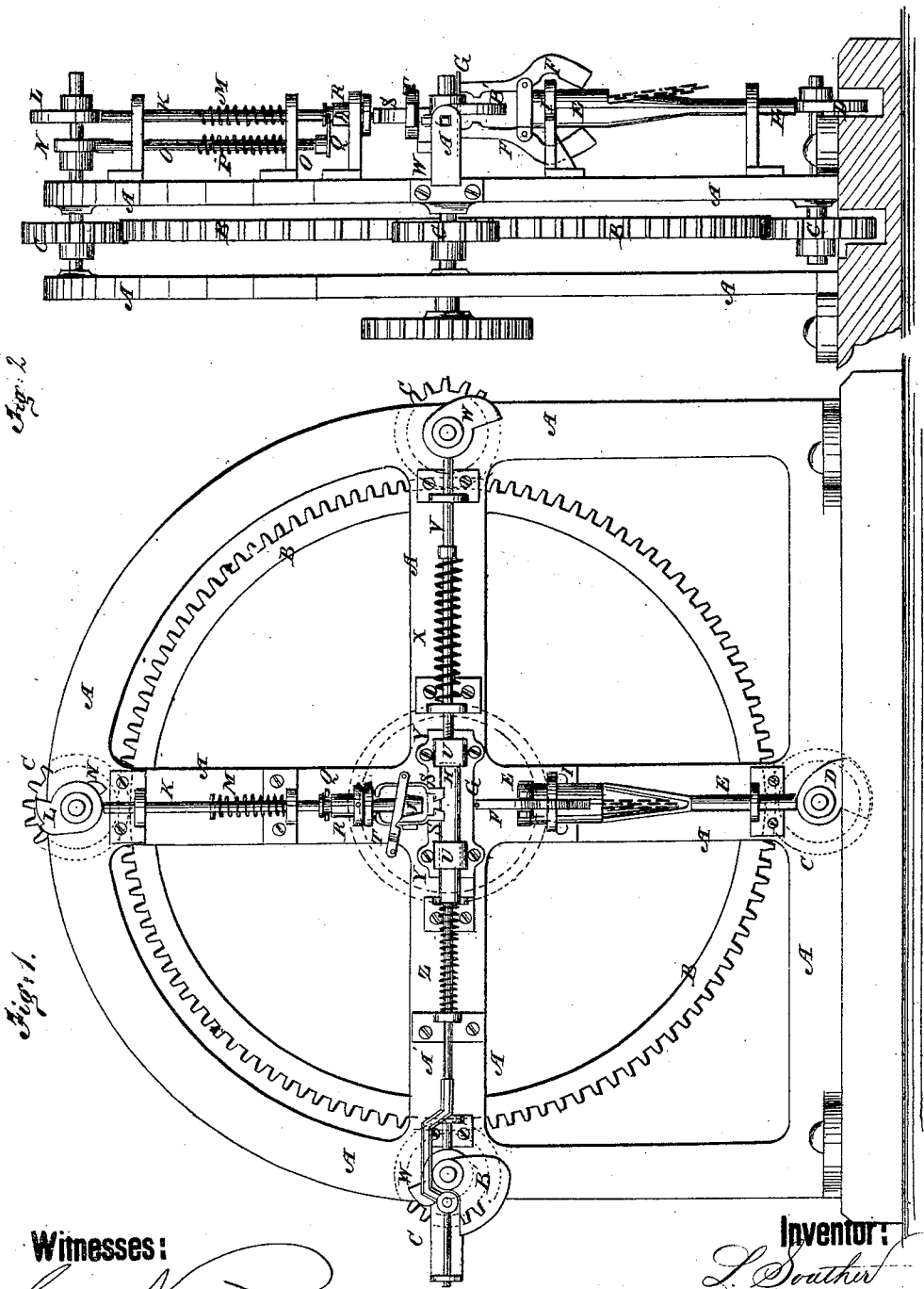

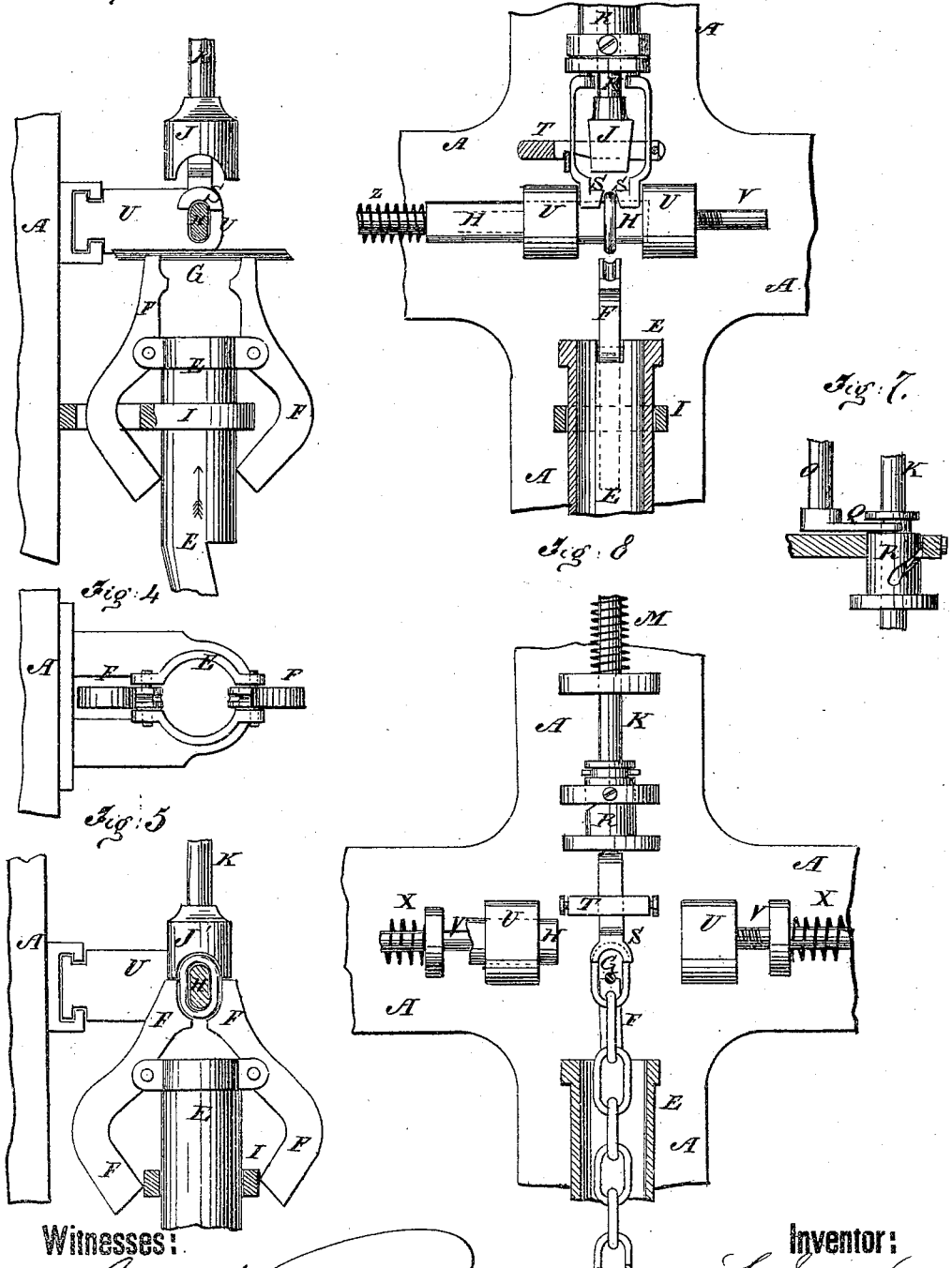

LOUIS SOUTHER, OF SPRINGFIELD, ILLINOIS.

IMPROVEMENT IN MACHINES FOR MAKING CHAINS.

Specification forming part of Letters Patent No. 141,734, dated August 12, 1873; application filed July 12, 1873.

*To all whom it may concern:*

Be it known that I, LOUIS SOUTHER, of Springfield, in the county of Sangamon and State of Illinois, have invented a new and useful Improvement in Machine for Making Metallic Chains, of which the following is a specification:

Figure 1, Sheet 1, is a front view of my improved machine. Fig. 2, Sheet 1, is a side view of the same. Fig. 3, Sheet 2, is a detail view, showing the parts in position for receiving a bar. Fig. 4, Sheet 2, is a detail top view of the fingers and hollow arm. Fig. 5, Sheet 2, is a detail view of the fingers and die in position for bending the link around the former. Fig. 6, Sheet 2, is a detail view, showing the lips and heads in position for welding the links. Fig. 7, Sheet 2, is a detail view of the slotted sleeve for turning the welded link into position for receiving another bar. Fig. 8, Sheet 2, is a detail view, showing the parts in position for receiving another bar.

Similar letters of reference indicate corresponding parts.

My invention has for its object to furnish a machine which shall be so constructed as to bend the iron into link form, weld its ends, and make a complete chain by a continuous operation, and which shall be simple in construction, convenient in use, and effective in operation. The invention consists in the four gear-wheels, the cams, and the arms, constructed and arranged to operate in connection with the large driving gear-wheel for giving motion to the operating mechanism; in the fingers operated by the guide-ring and the former, in combination with the arms, the cams, and the gear-wheels, for bending the bar to form the link; in the die, the lips, and the heads, in combination with the former, the arms, the cams, and the gear-wheels, for welding the open end of the link; and in the locking-bar, the spirally slotted or grooved sleeve, the arm, and the cam, in combination with the lips, to cause said lips to hold the completed link and turn it into position to receive the bar for the next link, as hereinafter fully described.

A represents two parallel frames firmly supported in a vertical position. B is a large gear-wheel, the journals of which revolve in bearings in the middle parts of the frames A, and which is revolved by power applied to one of its journals by suitable gearing. At the bottom, top, and sides of the large gear-wheel B are placed four small gear-wheels, C, the teeth of which mesh into the teeth of the large gear-wheel B, and the journals of which work in bearings in the frames A. To the forward end of the journal of the lower wheel C is attached a cam, D, upon which rests the lower end of the arm E. The upper part of the arm E is enlarged and made hollow, the upper opening of its cavity being in its upper end, and the lower opening of said cavity being in its forward side, a little below its upper end. Through this cavity the chain as completed passes from the machine, as shown in Figs. 1 and 2. Upon the forward and rear sides of the upper end of the arm E are formed lugs, to which are pivoted the fingers F. The upper ends of the fingers F are notched to receive the bars G, from which the links are to be formed. The inner sides of the upper ends of the fingers F are recessed so as to give the required form to the end of the link by pressing the bar G upon the former H. The fingers F are hung with a slight lateral inclination, so that the ends of the bar G, when pressed together around the former H, may overlap. The lower ends of the fingers F incline inward, as shown in Figs. 2, 4, and 5, so that as the arm E moves upward the said lower ends may strike against the guide-ring I, through which passes the upper end of the arm E. This forces the upper ends of the said fingers inward, pressing the middle part of the bar G closely around the lower part of the former H. The ends of the bar G are bent down upon the upper part of the former H by a die, J, attached to the lower end of the arm K, which is forced down at the proper time by a cam, L, attached to the journal of the upper wheel C. The arm K is raised, when released from the cam L, by a spring, M, coiled around it, as shown in Figs. 1 and 2. To the said journal of the said upper wheel C is attached another cam, N, which forces down the rod O at the proper time. The rod O is raised, when released from the cam N, by the spring P coiled around it. To the lower end of the rod O is attached a toe, Q, the end of which is forked and enters a groove in the sleeve R, so that the said sleeve may be raised and lowered by and with the arm O. The sleeve R moves up and down upon the arm K within the lower bearings for said arm, and is forced to make one-quarter of a revolution at each movement by pins attached to said bearing, and which enter spiral grooves in said sleeve. To the opposite sides of the lower end of the sleeve R is attached two springs, upon the lower ends of which are formed lips or dies S. T is a U-shaped locking or catch bar, the ends of which are pivoted to the ends of a short cross-bar attached to one of the springs S. The arms of the bar T rest in notches in a short cross-bar attached to the other spring S. The arms of the bar T are notched upon their lower sides to take hold of the said cross-bar and prevent the lips S from springing apart when released from the heads U. The heads U are attached to the inner ends of the arms V, which are forced inward by cams W attached to the journals of the side wheels C, and are forced outward by springs X coiled around them. The inner ends of the heads U slide in a dovetailed or T groove formed in the block Y attached to the frame A. In the outer ends of the heads U are formed holes to receive the former H, which moves back and forth in one of said heads, and enters the other head at each forward movement, and retires from it at each rearward movement. The former H is moved forward for the link to be formed upon it by a spring, Z, coiled upon the arm A', and is drawn back out of the welded link by the cam B' attached to the journal of one of the side wheels C.

In using the machine, the parts being in the position shown in Fig. 8, the bar G is laid upon the notched upper ends of the fingers F. As the machine moves forward the former H is thrown into the position shown in Fig. 1. The fingers F move upward, bending the bar G around the former H. The lips S descend upon each side of the upper ends of the bent bar, and the die J descends, bending the ends of the bar G down upon the upper part of the former H. The die J rises slightly, and the lips S are forced toward each other, welding the ends of the bar G between the lips S, the former H, and die J. The movement of the lips S toward each other allows the lock or catch bar T to drop, confining the lips S in position. The former H is then withdrawn from the link, and the sleeve R, the lips S, and the link make a quarter revolution, coming into such a position that another bar, G, may be thrust through the link and laid upon the ends of the fingers F. The locking-bar T now slightly descends, bringing its bend in contact with the block Y, which releases the lips S, allowing them to spring apart and the link to drop upon the bar G. The lips S now return to their former position, the former H is thrust forward, and so on. The chain, as completed, passes down through the hollow bar E.

Having thus described my invention, I claim as new and desire to secure by Letters Patent—

1. The four gear-wheels C, the cams D L N W W B', and arms E K O V V A', constructed and combined with the large driving gear-wheel B, for giving motion to the operating mechanism, substantially as herein shown and described.

2. The fingers F, operated by the guide-ring I and the former H, in combination with the arms E and A', the cams D B', and gear-wheels C B, for bending the bar to form the link, substantially as herein shown and described.

3. The die J, lips S, and heads U, in combination with the former H, the arms K V V, cams L W W, and gear-wheels C B, for welding the open end of the link, substantially as herein shown and described.

4. The locking-bar T, spirally slotted or grooved sleeve R, arm O, and cam N, in combination with the lips S, to cause said lips to hold the completed link and turn it into position to receive the bar for the next link, substantially as herein shown and described.

LOUIS SOUTHER.

Witnesses:
J. A. CHESNUT,
GEO. H. SOUTHER.